United States Patent [19]

Nakayama et al.

[11] 4,277,525

[45] Jul. 7, 1981

[54] LIQUID COMPOSITIONS FOR FORMING SILICA COATING FILMS

[75] Inventors: Muneo Nakayama, Tokyo; Toshihiro Nishimura; Hisashi Nakane, both of Kawasaki; Shozo Toda, Fujisawa; Yoshio Hotta, Yamato; Mitsuaki Minato, Kawasaki, all of Japan

[73] Assignees: Tokyo Ohka Kogyo Kabushiki Kaisha; Tokyo Denshi Kagaku Kabushiki Kaisha, both of Tokyo, Japan

[21] Appl. No.: 133,092

[22] Filed: Mar. 24, 1980

Related U.S. Application Data

[63] Continuation of Ser. No. 1,681, Jan. 8, 1979, abandoned.

[30] Foreign Application Priority Data

Sep. 1, 1978 [JP] Japan .................................. 53-107380

[51] Int. Cl.$^3$ .............................................. B05D 3/02
[52] U.S. Cl. ................................ 427/387; 106/197 R; 106/218; 106/287.12; 260/97; 427/240; 427/388.2; 427/393.6; 525/50; 525/61; 525/100; 525/103; 525/431; 525/453; 525/480; 525/523; 528/26; 427/397.7
[58] Field of Search ................... 427/387, 389.7, 393.6, 427/388.2, 421, 428, 429; 428/447; 106/287.14, 287.15, 287.16, 287.12, 197 R, 198, 218; 260/97; 528/26, 29; 525/50, 61, 100, 103, 480, 431, 523, 453

[56] References Cited

U.S. PATENT DOCUMENTS

| | | | |
|---|---|---|---|
| 3,849,187 | 11/1974 | Fetscher et al. | 427/387 X |
| 4,006,271 | 2/1977 | French et al. | 428/447 X |
| 4,026,826 | 5/1977 | Yoshida et al. | 428/447 X |
| 4,027,073 | 5/1977 | Clark | 428/412 |
| 4,103,065 | 7/1978 | Gagnon | 427/387 X |
| 4,170,690 | 10/1979 | Armbruster et al. | 428/447 |
| 4,186,026 | 1/1980 | Rotenberg et al. | 106/287.14 |

*Primary Examiner*—Ronald H. Smith
*Assistant Examiner*—Thurman K. Page
*Attorney, Agent, or Firm*—Wyatt, Gerber, Shoup, Scobey & Badie

[57] ABSTRACT

Liquid compositions suitable for providing silica-based coating films on to various substrate surfaces are prepared by the reaction of an alkoxy-containing silane, a lower carboxylic acid and an alcohol in the presence of a reaction accelerator which is an organic acid different from the above mentioned lower carboxylic acid. The reaction proceeds very smoothly even in the absence of any halogen-containing compounds, and the resultant liquid coating compositions are free from the problem of corrosion due to the presence of a halogen-containing ingredient.

14 Claims, No Drawings

LIQUID COMPOSITIONS FOR FORMING SILICA COATING FILMS

This is a continuation of application Ser. No. 001,681 filed Jan. 8, 1979, now abandoned.

BACKGROUND OF THE INVENTION

The present invention relates to novel liquid compositions for providing silica coating films on various substrates, methods for the preparation thereof and processes for forming silica coating films on a substrate with the same.

Formation of silica coating films on various substrates is usually performed by chemical vapor-phase deposition or by liquid coating. The former method has obtained wider prevalence but this method is defective in several aspects including, for example, the necessity of special apparatus, limitations in the dimensions of the substrate articles, difficulty in mass production, minimum applicability to the formation of mixed coating layers of an organic substance and an inorganic substance and the like. Therefore it is a recent trend that the method of liquid coating is replacing the vapor-phase deposition method more and more owing to the simplicity of the process.

The liquid coating method however, is not free from several problems such as the tendency of precipitation of the particulate ingredients in the coating liquid prepared by dispersing powders of silica or a glass in a solvent with a soluble polymeric substance as the suspending agent or a binder, unevenness in the thickness of the coating films and occurrence of pinholes in the coating films, especially, when the coating film is thin. As a result, the method is not always satisfactory as an industrially practicable procedure. In order to overcome these problems, a method has been proposed in which the powdery silica is replaced with the reaction product of a carboxylic acid, a halogenated silane and an alcohol in the formulation of the coating liquid (see, for example, Japanese Patent Publication Nos. SHO 52-16488 and SHO 52-20825). Although this method presents improvements in the precipitation of the particulate ingredients in the coating liquid and unevenness in the thickness of the coating films, it is subject to another problem that the coating liquid necessarily contains undesirable halogenated compounds as by-products such as hydrogen halides, e.g. hydrogen chloride, and carboxylic acid halides, e.g. acetyl chloride. These halogenated compounds cannot be removed completely because presence of the halogenated compound is indispensable for the desired reaction to take place whereas an excessive amount of the halogenated compound affects the stability of the coating liquid adversely leading to undesirable gelation of the coating liquid during storage so that the concentration of the halogenated compounds in the coating liquid must be controlled within a narrow range during the reaction. In addition to the above inconvenience, the presence of the halogenated compounds in the coating liquid after completion of the reaction causes corrosion of the substrate surfaces during coating or subsequent heating steps.

There has been a great demand, therefore, for a coating liquid containing no halogenated compounds which still permit the necessary reaction to proceed smoothly in the coating liquid.

SUMMARY OF THE INVENTION

It is therefore an object of the present invention to provide a coating liquid for forming silica coating films on various substrates free from the above described problems.

Another object of the invention is to provide a method for the preparation of the coating liquid as given above.

Still another object of the invention is to provide a process for forming a silica coating film on various substrates by use of the coating liquid as given above.

The coating liquid of the present invention comprises a reaction product obtained by the reaction of an alkoxysilane, a lower carboxylic acid or an anhydride thereof and an alcohol in the presence of a reaction accelerator which is an organic acid different from the above mentioned lower carboxylic acid, especially, in having a lower dissociation index as expressed by $pK_a$.

DETAILED DESCRIPTION OF THE PREFERRED EMBODIMENTS

The alkoxysilanes suitable for use in the formulation of the coating liquids of the invention may be expressed by the general formula $$R^1{}_n Si(OR^2)_{4-n},$$

in which $R^1$ and $R^2$ are each the same or different hydrocarbon groups such as methyl, ethyl, propyl, butyl, vinyl, phenyl and the like and n is zero or 1. Typical examples include tetraalkoxysilanes such as tetramethoxysilane, tetraethoxysilane, tetrapropoxysilane, tetrabutoxysilane, tetraphenoxysilane and the like and trialkoxysilanes such as methyltriethoxysilane, ethyltriethoxysilane, vinyltriethoxysilane and the like with preference of the former class of the silanes due to the higher hardness of the silica coating films obtained therewith. These alkoxysilanes are used either singly or as a mixture of two or more. Partial hydrolyzates thereof can also be used.

The second reactant is a lower carboxylic acid or an anhydride thereof and the lower carboxylic acid has preferably 2 to 7 carbon atoms in a molecule and has an acid strength corresponding to a dissociation index $pK_a$ larger than 4.0. Exemplary of such lower carboxylic acid are acetic acid, propionic acid, butyric acid, valeric acid, caproic acid and the like. Acetic anhydride, propionic anhydride and the like are named as the examples of the anhydrides of the lower carboxylic acids.

The third reactant is a monovalent or divalent alcohol with less than 5 carbon atoms in a molecule as exemplified by methyl alcohol, ethyl alcohol, propyl alcohol, butyl alcohol, ethylene glycol and the like. The most preferred are methyl alcohol and ethyl alcohol. They are used either singly or as a mixture of two or more.

The reaction accelerator for catalytically accelerating the reaction of the above described three reactants is an organic acid different from the lower carboxylic acid described above as the second reactant in having a smaller dissociation index as expressed by $pK_a$ not exceeding 4.0 while the lower carboxylic acids used in the invention all have a value of $pK_a$ value larger than 4.0. These organic acids include carboxylic acids such as formic acid, oxalic acid, citric acid, malonic acid, salicylic acid, picric acid, phthalic acid, maleic acid and the like and organic sulfonic acids such as benzenesulfonic acid, toluenesulfonic acid, naphthalenesulfonic acid and the like. When the presence of a halogen compound is of no problem, certain halogen-containing acids such as chloroacetic acid and fluoroacetic acid may also be used. In some cases, better results are obtained by use of these organic acids as the reaction accelerator in combination with an inorganic acid containing no halogen.

The coating liquid of the present invention is prepared by mixing the three reactants, i.e. the alkoxysilane, a lower carboxylic acid or an anhydride thereof and an alcohol, to form a reaction mixture, into which the reaction accelerator is admixed. An an exothermic reaction takes place gradually to produce a hydroxy-substituted silane, which can be detected by the molybdenum-blue method, and an ester of the lower carboxylic acid.

The hydroxy-substituted silane above mentioned may typically be expressed by the general formula $R^1_nSi(OH)_m(OR^2)_{4-m-n}$, where $R^1$, $R^2$ and n each have the same meaning as defined above and m is a positive integer with the proviso that $n+m$ does not exceed 4. The exact the nature of the reaction taking place in the reaction mixture is probably too complicated to be understood in terms of a simple hydrolysis of the alkoxysilane.

After 2 to 5 hours from the beginning of the reaction, all of the alkoxysilane has been consumed, and there is a decrease in the amount of the lower carboxylic acid to 20% or less based on the amount of starting acid after 2 to 5 days of standing at room temperature. The temperature of the reaction mixture may be increased to 50°–70° C. to accelerate the reaction, but the recommended procedure is to maintain the temperatur at a value not exceeding 50° C. in order to avoid premature gelation of the reaction mixture. Thus the resultant reaction mixture contains the hydroxy-substituted silane, the ester of the lower carboxylic acid and the remaining alcohol as the main ingredients.

The blending ratios of the reactants and the reaction accelerator are also subject to limitations and the amount of the lower carboxylic acid is in the range from 2 to 5 moles or, preferably, from 3.5 to 4.5 moles and the amount of the alcohol is in the range from 2 to 10 moles or, preferably, from 4 to 8 moles per mole of the alkoxysilane. When an acid anhydride is used in place of the lower carboxylic acid, the amount of the acid anhydride may be reduced to a half of the preferred amount of the carbocylic acid by moles. The amount of the reaction accelerator is preferably in the range from 0.1 to 20% by weight based on the alkoxysilane.

The progress of the reaction may be followed periodically by the techniques of gas chromatography, infrared absorption spectroscopy and the like until the amount of the lower carboxylic acid decreases to 20% or less of the starting amount, which is an essential condition for obtaining a coating liquid capable of giving a smooth coating film of even spreading with a uniform thickness in an ambient atmosphere at room temperature on various substrate surfaces.

It is well known that hydrolysis of the alkoxysilane with a strong acid produces a reaction liquid of low stability with a tendency toward gelation and water alone or water admixed with a carboxylic acid are not effective for hydrolysis of alkoxysilanes. Further, hydrolysis of alkoxysilanes with mixtures of a lower carboxylic acid and an alcohol proceeds with difficulty even with heating at an elevated temperature if a reaction accelerator is not added to the reaction mixture so that the alkoxysilane and the carboxylic acid remain intact in the reaction mixture after prolonged standing. When such a reaction mixture containing large amounts of residual carboxylic acid and the alkoxysilane is used as a coating liquid, uneven spreading frequently takes place on the surface of the substrate and this leaves unwetted areas on the substrate with the result that satisfactory, uniform coating films are not obtained. Therefore it is necessary to react the alkoxysilane, the lower carboxylic acid and the alcohol in the presence of a reaction accelerator as specified above to an extent such that there is a substantial decrease in the amount of the free carboxylic acid.

When the reaction accelerator is liquid at room temperature, it is convenient to mix the reaction accelerator as such to the reaction mixture of the alkoxysilane, lower carboxylic acid and alcohol but, when the reaction accelerator is solid at room temperature with a small velocity of dissolution, it is recommended that the reaction accelerator be dissolved in advance in the lower carboxylic acid or alcohol and the solution thereafter blended with the solution with the other reactants.

The thus obtained reaction mixture after completion of the reaction is optionally diluted with an organic solvent to adjust the solid content of the coating liquid. The mixture may then be filtered with a filter having 0.2–1.0 μm openings before it is used as a coating liquid to remove any solid matter formed during the reaction, if necessity.

Any of a wide variety of organic solvents may be employed. These include alcohols such as methyl alcohol, ethyl alcohol and the like; esters such as methyl acetate, ethyl acetate, butyl acetate and the like; ketones such as acetone, methylethylketone, acetyl acetone and the like; polyvalent alcohols such as ethylene glycol and esters or ethers thereof; and mixtures of two or more of the above named solvents. Alcohols or mixed solvents mainly composed of an alcohol are preferred.

The coating liquid of the present invention may be mixed with a glass-forming substance or an organic polymer as a film-forming agent. The glass-forming substance is a compound soluble in a mixed organic solvent composed mainly of an alcohol and an ester and capable of being vitrified by heating including phosphorus compounds such as $P_2O_5$, $H_3PO_4$, $H_3PO_3$, $H_4P_2O_7$, $(RO)_3P$, $(RO)_2POH$, $(RO)_3PO$, $RP(OR')_2$, $R_2P(OH)$, $R_2PO(OH)$, $RPO(OH)_2$ and the like, boron compounds such as $B_2O_3$, $H_3BO_3$, $(RO)_3B$, $RB(OR')_2$, $R_2BOR'$, $RB(OH)_2$, $R_2BOH$, $R_3B$, $(RBO)_n$, $(R_2B)_2O$ and the like, arsenic compounds such as $H_3AsO_3$, $H_3AsO_4$, $(RO)_3As$, $(RO)_2AsOH$, $RAs(OR')_2$, $RAsH_2$, $R_2AsH$, $R_3As$, $RAsO$, $(R_2As)_2O$, $R_3AsO$, $RAs(OH)_2$, $RAsO(OH)_2$ $R_2As(OH)$ and the like, antimony compounds such as $H_3SbO_4$, $H_3SbO_3$, $H_4Sb_2O_7$, $H_5Sb_3O_{10}$, $(RO)_3Sb$, $(RO)_2Sb(OH)$, $RSb(OR')_2$, $R_5Sb$, $RSbO$, $(R_2Sb)_2O$, $R_3SbO$, $R_2SbO(OH)$, $RSbO(OH)_2$ and the like; zinc compounds such as $Zn(OCOCH_3)_2$, $Zn(OR)_2$ and the like; lead compounds such as $Pb(OCOCH_3)_4$, $Pb(OR)_4$ and the like; and gallium compounds such as $R_2Ga(OH)$, $RGa(OH)_2$ and the like; where R and R' are each an alkyl or an aryl group. They may be used as a combination of two or more.

The organic polymers as the film-forming agent above mentioned are selected from those polymeric compounds soluble in a mixed solvent mainly composed of an alcohol and an ester and compatible with the hydroxy-substituted silanes. These include, for example, polyvinyl acetate, polyvinyl formal, polyvinyl acetal, polyvinyl butyral, polyvinyl ether, polyvinyl pyrrolidone, ethylcellulose, shellac, phenolic resins, epoxy resins, polyamide resins, polyurethane resins and mixtures thereof.

The coating liquid for silica coating films in accordance with the present invention is usually diluted to a concentration of 1 to 20% by weight as $SiO_2$ before it is put to use. The glass-forming substance is added to the coating liquid in an amount from 10 to 500% by weight based on $SiO_2$ and the organic polymer as the film-forming agent is added in an amount from 10 to 500% by weight based on $SiO_2$ in consideration of the viscosity of the coating liquid as well as the desired thickness of the resultant coating films.

The material of the substrate to be provided with a silica coating film by use of the inventive coating liquid should be resistant to the organic solvent employed. Typically useful examples include glasses, ceramics, mica, silicon, germanium, gallium arsenide, aluminum, copper, iron, silver, gold, stainless steel, brass, saturated polyesters, gelatin, polyimide resins, and the like.

The techniques for providing silica coating films on the selected substrate surface may be any one of conventional procedures including the spinner and dipping methods spray coating, screen printing, roller coating, brush coating and the like. After being coated with the coating liquid of the invention, the substrate is heated, usually in air, at a temperature of 150° C. or higher to give a coating film of silica or a binary coating film of silica-glass or silica-organic polymer.

Because the reaction is controlled by adjusting the amount of the reaction accelerator even without formulating a halogen-containing compound in the composition, the coating liquids thus obtained have advantages in the uniformity of performance from lot to lot in the manufacture and also in the simplified manufacturing process owing to the absence of undesirable by-products such as hydrogen chloride and acetyl chloride.

The coating liquids of the present invention can readily give a smooth and uniform, continuous coating film without pinholes having a thickness of 0.05 to 20 μm according to need. Therefore, substrate articles with stepped or rugged surfaces can be coated to have smooth surfaces so that breaking of wires at cross-overs as well as decreased product yield and lowered reliability can, as a consequence, be effectively prevented. The coating liquids are useful in forming insulation films on a multi-layer circuits of electronic parts. The coating films obtained with the inventive coating liquids have excellent abrasion and chemical resistance so that coating liquids find wide applications for providing protective films on various kinds of metals, e.g. aluminum, iron, copper, silver, gold, stainless steel, brass, and the like, and plated surfaces thereof, as well as for providing overlay coating on polymeric films such as gelatin and polyesters. Further the coating films obtained with the coating liquid of the invention exhibit capturing activity for certain detrimental impurities such as sodium ions when they are applied to the surfaces of semiconductors and glass plates so that it is useful also as a passivating agent for providing passivation films on such surfaces. In addition, the inventive coating liquids are useful in forming orientation membranes in liquid crystal cells, doped oxide films on semiconductors, antistatic coating films, and the like.

Following are examples to illustrate the present invention in further detail.

EXAMPLE 1

Into a mixture of 152 g (1 mole) of tetramethoxysilane, 240 g (4 moles) of glacial acetic acid and 128 g (4 moles) of methyl alcohol at room temperature was added 10 g of oxalic acid with agitation to effect the reaction. The reaction proceeded with evolution of heat to increase the temperature of the reaction mixture to about 40° C. The agitation was continued for 3 hours followed by standing for 3 days at room temperature. The resultant reaction mixture contained large amounts of methyl acetate and hydroxy-substituted silanes. The compositions of the reaction mixture with respect to the volatilizable components as determined by gas chromatography are set out in Table 1 below.

TABLE 1

| Volatilizable component | Contents, % by weight | | | |
|---|---|---|---|---|
| | Before addition of oxalic acid | After 3 hours | After 24 hours | After 72 hours |
| Tetramethoxy-silane | 25.3 | 0 | 0 | 0 |
| Acetic acid | 44.7 | 44.2 | 27.4 | 3.5 |
| Methyl alcohol | 30.0 | 40.2 | 38.6 | 34.0 |
| Methyl acetate | 0 | 15.6 | 34.0 | 62.5 |

The solid content of the reaction mixture after 72 hours of standing was 12.5% by weight.

For comparison, the same preparation procedure as above was repeated with the exception of the omission of oxalic acid as the reaction accelerator to give a result that the volatile fraction of the reaction mixture after 10 days of standing was composed of 3.9% by weight of tetramethoxysilane, 37.4% by weight of acetic acid, 41.0% by weight of methyl alcohol and 17.7% by weight of methyl acetate.

The reaction mixture after 72 hours of standing having a solid content of 12.5% by weight was then diluted with ethyl alcohol to a concentration of 5.9% by weight and filtered with a filter of 0.45 μm opening to give a finished coating liquid for silica coating films.

The thus obtained coating liquid was applied with a spinner on to a glass plate followed by heat treatment first at 200° C. for 30 minutes and then at 500° C. for 30 minutes to give coating films of silica with thickness as set out below.

| Rotational velocity of the spinner, r.p.m. | Thickness of film, Å |
|---|---|
| 1,000 | 2,200 |
| 2,000 | 1,300 |
| 3,000 | 1,000 |
| 4,000 | 800 |
| 5,000 | 700 |
| 6,000 | 650 |

The properties of these coating films were as follows.

| | |
|---|---|
| Refractive index | 1.44 |
| Dielectric constant | 4.0 |
| Linear thermal expansion coefficient | $5 \times 10^{-7}$/°C. |
| Sheet resistance (for 2,200 Å thickness) | $1 \times 10^{15}$ ohm/☐ (ohm per square) |
| Rate of etching (1 mole/liter HF, 25° C.) | 30 Å/second |

EXAMPLE 2

Into a mixture of 208 g (1 mole) of tetraethoxysilane, 240 g (4 moles) of glacial acetic acid and 184 g (4 moles) of ethyl alcohol under agitation was added 15.0 g of maleic acid whereupon the reaction began with evolution of heat resulting in elevation of the temperature of the reaction mixture to about 50° C. The agitation was continued for 5 hours followed by standing at room temperature for 3 days. The proceeding of the reaction was checked by gas chromatography to find that tetraethoxysilane disappeared within 2 hours and acetic acid was decreased to about one seventh of the starting amount after 24 hours of reaction with the formation of large amounts of ethyl acetate and hydroxy-substituted silanes. The results of the gas chromatographic analysis for the volatilizable components in the reaction mixture are set out in Table 2 below.

TABLE 2

| Volatilizable component | Contents, % by weight | | |
|---|---|---|---|
| | Before addition of maleic acid | After 5 hours | After 24 hours |
| Tetraethoxysilane | 32.2 | 0 | 0 |
| Acetic acid | 35.4 | 26.0 | 5.0 |
| Ethyl alcohol | 32.4 | 41.2 | 38.3 |
| Ethyl acetate | 0 | 32.8 | 56.7 |

The solid content of the reaction mixture after 3 days of standing was 11.87% by weight. The reaction mixture thus obtained was diluted with ethyl alcohol to a solid content of 11.0% by weight followed by filtration with a filter of 0.45 μm opening to give a finished coating liquid for silica coating films.

The thus obtained coating liquid was applied on to a wafer of high purity silicon with a spinner followed by heat treatment first at 200° C. for 30 minutes and then at 700° C. for 30 minutes to give coating films of silica with thickness as set out below.

| Rotational velocity of the spinner, r.p.m. | Thickness of film, Å |
|---|---|
| 1,000 | 4,200 |
| 2,000 | 3,000 |
| 3,000 | 2,400 |
| 4,000 | 1,800 |
| 5,000 | 1,600 |
| 6,000 | 1,500 |

The physical properties of these silica films thus prepared were almost identical with those in Example 1.

EXAMPLE 3

Into a mixture of 264 g (1 mole) of tetrapropoxysilane, 222 g (3 moles) of propionic acid and 300 g (5 moles) of propyl alcohol under agitation at room temperature was added 10.0 g of salicylic acid whereupon the reaction temperature increased to about 40° C. The agitation was continued for 3 hours and then the reaction mixture was kept standing at room temperature for 4 days. The proceeding of the reaction was checked at intervals by gas chromatographic analysis to find that tetrapropoxysilane disappeared within about 4 hours while propionic acid decreased to 4.0% of the starting amount after 4 days of standing. The solid content of the resultant reaction mixture was 11.8% by weight.

The above obtained reaction mixture was diluted to a solid content of 5.90% by weight by adding a mixed solvent of methyl alcohol and acetone in a ratio of 3:1 by weight and further 0.5 g of phosphorus pentoxide was dissolved into the mixture followed by filtration with a filter of 0.45 μm opening to give a coating liquid for vitreous coating films of phosphorus-doped silica.

Glass plates were coated with the thus prepared coating liquid by dipping in and pulling out of the liquid at a controlled speed followed by heat treatment first at 150° C. for 15 minutes and then at 500° C. for 30 minutes to give coating films of silica-phosphorus glass with thickness as set out below.

| Speed of pulling out, cm/minute | Thickness of film, Å |
|---|---|
| 20 | 700 |
| 30 | 850 |
| 40 | 950 |

The thus obtained coating films presumably have a structure in which the $SiO_2$ units and the $P_2O_5$ units are distributed uniformly throughout to form a network structure of Si-O-Si, P-O-P and Si-O-P linkages. The physical properties of these coating films are set out below.

| | |
|---|---|
| Rate of etching (1 mole/liter HF) | 300 Å/second |
| Breakdown voltage | $2 \times 10^6$ volts/cm |
| Linear thermal expansion coefficient | $35 \times 10^{-7}$/°C. |
| Sheet resistance (for 1,000 Å thickness) | $1 \times 10^{14}$ ohm/□ |

EXAMPLE 4

Into a mixture of 320 g (1 mole) of tetrabutoxysilane, 232 g (3.87 moles) of glacial acetic acid and 128 g (4 moles) of methyl alcohol under agitation at room temperature was added 10.0 g of picric acid whereupon the reaction temperature increased to about 40° C. The agitation was continued for a short while and then the reaction mixture was kept standing at room temperature for 4 days. Along with the formation of a hydroxy-substituted silane, the resultant reaction mixture contained methyl acetate, butyl acetate and butyl alcohol as the volatile reaction products. The solid content of this reaction mixture was 11.0% by weight.

The thus obtained reaction mixture was diluted to a solid content of 8.0% by weight by adding a mixed solvent of ethyl alcohol, ethyl acetate and acetone in a ratio of 2:1:1 by weight and further 5 g of boric anhydride and 5 g of phosphorus pentoxide were dissolved in the mixture followed by filtration with a filter of 0.45 μm opening to give a coating liquid for vitreous coating films of silica glass doped with boron and phosphorus.

The above prepared coating liquid was applied to dry glass plates for photo process having been provided with a negative pattern of silver in the gelatin layer by dipping in the same manner as in Example 3 followed by heat treatment at 200° C. for 30 minutes to give coating films of vitreous silica with thickness as set out below.

| Speed of pulling out, cm/minute | Thickness of film, Å |
|---|---|
| 20 | 1,200 |
| 30 | 1,500 |

| Speed of pulling out, cm/minute | Thickness of film, Å |
| --- | --- |
| 40 | 1,700 |

These coating films presumably have a structure in which the units of $SiO_2$, $P_2O_5$ and $B_2O_3$ are distributed uniformly throughout to form a network structure of Si-O-Si, P-O-P, B-O-B, Si-O-P, Si-O-B and Si-O-P-O-B linkages.

The hardness of the coating films on the dry plate with a thickness of 1,200-1,700 Å was tested by pencil scratching and found to be higher than 9H of the pencil hardness indicating an improvement over the hardness of 7H of uncoated dry plates.

The light absorption in these coating films was very insignificant and the decrease in light transmission of the coated dry plate with the 1,700 Å silica film thereon was 5% or less over wavelength regions of both visible and ultraviolet.

EXAMPLE 5

Into a mixture of 152 g (1 mole) of tetramethoxysilane, 240 g (4 moles) of glacial acetic acid and 128 g (4 moles) of methyl alcohol under agitation at room temperature was added 10.0 g of p-toluenesulfonic acid whereupon the reaction temperature increased to about 45° C. The agitation was continued for 5 hours and then the reaction mixture was kept standing at room temperature for 3 days. During this period, the progress of the reaction was checked at intervals to find that large amounts of methyl acetate and hydroxy-substituted silanes were formed in the reaction mixture. The amount of acetic acid remaining in the reaction mixture after 3 days was 5.5% as determined by gas chromatography, and the solid content was 11.5% by weight.

The thus obtained reaction mixture was diluted to a solid content of 5.9% by weight by adding ethyl alcohol to give a coating liquid for silica coating films.

Into 100 ml portions of the above prepared coating liquid was added 3.0 g each of phosphorus pentoxide, boric anhydride, ortho-arsenic acid or triphenyl antimony and the resultant liquids were filtered with a filter of 0.2 μm opening to give finished coating liquids for silica-phosphorus, silica-boron, silica-arsenic and silica-antimony coating films.

These coating liquids were applied on to silicon wafers of N-type or P-type at a dopant level of $10^{16}$ atoms/cm$^3$ with a spinner rotating at 4,000 r.p.m. followed by heating at 200° C. for 30 minutes and diffusion treatment at 1,200° C. After completion of the diffusion treatment, the coating films of silica glass, i.e. the doped oxide films, were removed with 20% aqueous solution of hydrofluoric acid. The sheet resistance of the thus obtained silicon wafers was as follows.

| Dopant | Sheet resistance ohm/□ | Time of diffusion, hours | Atmosphere of diffusion |
| --- | --- | --- | --- |
| Phosphorus | 5.0 | 1 | $N_2$ |
| Boron | 8.0 | 1 | $N_2$ |
| Arsenic | 10 | 10 | $N_2:O_2 = 4:1$ |
| Antimony | 20 | 10 | $N_2:O_2 = 4:1$ |

EXAMPLE 6

Into a mixture of 320 g (1 mole) of tetrabutoxysilane, 240 g (2.35 moles) of acetic anhydride and 128 g (4 moles) of methyl alcohol under agitation at room temperature was added 5.0 g of citric acid whereupon the reaction temperature increases to about 40° C. The reaction mixture was heated to 50° C. and agitation was continued for 5 hours. The mixture was then kept standing at room temperature for 3 days. During this period, butyl acetate and hydroxy-substituted silanes were produced in the reaction mixture. The solid content of the resultant reaction mixture was 11.6% by weight.

The thus obtained reaction mixture was diluted to a solid content of 3.0% by weight by adding a mixed solvent of methyl alcohol and ethyleneglycol monomethyl ether in a ratio of 2:1 by weight and further admixed with 5.0 g of phosphorus pentoxide, 5.0 g of boric acid and 10.0 g of a butyral resin with an average degree of polymerization 2,000 followed by filtration with a filter of 0.45 μm opening to give a coating liquid for silica glass-polymer coating films.

The thus prepared coating liquid was applied on to a gold-plated copper plate by spraying in a coating amount of 2 μm in thickness as dried with subsequent heat treatment at 250° C. for 1 hour to give a silica glass-polymer coating film.

The coating film was resistant against an organic solvent mainly composed of an alcohol and an ester as well as against acids such as hydrochloric acid, nitric acid, sulfuric acid and the like. The coating liquid was also useful for providing protective coating films on metals owing to the excellent adhesivity and antiabrasion resistance.

EXAMPLE 7

Into a mixture of 178 g (1 mole) of methyltriethoxysilane, 300 g (5 moles) of glacial acetic acid and 276 g (6 moles) of ethyl alcohol under agitation at room temperature was added 10 g of oxalic acid whereupon the reaction temperature increased to about 40° C. The agitation was continued for 2 hours followed by standing of the mixture at room temperature for 4 days. Gas chromatographic analysis undertaken with the reaction mixture under reaction indicated the disappearance of methyltriethoxysilane after about 5 hours from the beginning of the reaction and the decrease of the amount of acetic acid to 2.0% by weight of the volatile fraction of the reaction mixture after 4 days of standing. The solid content of the thus obtained reaction mixture was 8.5% by weight and was adjusted to 5.9% by weight by adding ethyl alcohol to give a coating liquid for silica coating.

The coating liquid above prepared was applied to a silicon substrate by use of a spinner with varied spinner velocities and dried with following heat treatment at 900° C. for 10 minutes to give silica coating films with thickness as given below.

| Rotational velocity of the spinner: r.p.m. | Thickness of film, Å |
| --- | --- |
| 1,000 | 1,500 |
| 2,000 | 1,000 |
| 3,000 | 800 |
| 4,000 | 700 |

The properties of these coating films were as follows.
Etching velocity

| | |
|---|---|
| (1 mole/liter HF) | 150 Å/second |
| Breakdown voltage | $3 \times 10^6$ volts/cm |
| Linear thermal expansion coefficient | $3 \times 10^{-7}/°C$ |
| Sheet resistance (for 1,000 Å thickness) | $5 \times 10^{14}$ ohm/□ |

What is claimed is:

1. A liquid coating composition for forming silica-based coating films which comprises a product obtained by the reaction of a reaction mixture composed of
   (a) an alkoxysilane represented by the general formula $R^1{}_n Si(OR^2)_{4-n}$, where $R^1$ and $R^2$ are each a hydrocarbon group selected from the class consisting of methyl, ethyl, propyl, butyl, vinyl and phenyl groups and n is zero or 1;
   (b) from 2 to 5 moles per mole of the alkoxysilane of a lower carboxylic acid containing 2 to 7 carbon atoms and having a dissociation index $pK_a$ larger than 4.0, or an anhydride thereof; and
   (c) from 2 to 10 moles per mole of the alkoxysilane of an alcohol containing 1 to 4 carbon atoms;
in the presence of a reaction accelerator which is an organic acid having a dissociation index $pK_a$ up to 4.0.

2. The liquid coating composition as claimed in claim 1 wherein n is zero.

3. The liquid coating composition as claimed in claim 1 wherein the lower carboxylic acid is selected from the group consisting of acetic acid, propionic acid, butyric acid, valeric acid and caproic acid.

4. The liquid coating composition as claimed in claim 1 wherein the alcohol is methyl alcohol or ethyl alcohol.

5. The liquid coating composition as claimed in claim 1 wherein the reaction accelerator is a carboxylic acid or an organic sulfonic acid.

6. The liquid coating composition as claimed in claim 5 wherein the carboxylic acid is selected from the class consisting of formic acid, oxalic acid, citric acid, malonic acid, salicylic acid, picric acid, phthalic acid and maleic acid.

7. The liquid coating composition as claimed in claim 5 wherein the organic sulfonic acid is selected from the class consisting of benzenesulfonic acid, toluenesulfonic acid and naphthalenesulfonic acid.

8. The liquid coating composition as claimed in claim 1 wherein the amount of the reaction accelerator is in the range from 0.1 to 20% by weight based on the amound of the alkoxysilane.

9. The liquid coating composition as claimed in claim 1 wherein the reaction is conducted at a temperature up to 50° C.

10. The liquid coating composition as claimed in claim 1 wherein the amount of the lower carboxylic acid in the product of the reaction is less than 20% of the amount of the same before the reaction.

11. A mixture comprising a liquid coating composition as claimed in claim 1 together with a glass-forming agent.

12. A mixture comprising a liquid coating composition as claimed in claim 1 together with an organic polymer film-forming agent.

13. A method for the preparation of a liquid coating composition for forming silica-based coating films which comprises mixing a reaction accelerator which is an organic acid having a dissociation index $pK_a$ up to 4.0 with a reaction mixture composed of
   (a) an alkoxysilane represented by the general formula $R^1{}_n Si(OR^2)_{4-n}$, where $R^1$ and $R^2$ are each a hydrocarbon group selected from the class consisting of methyl, ethyl, propyl, butyl, vinyl and phenyl groups and n is zero or 1;
   (b) from 2 to 5 moles per mole of the alkoxysilane of a lower carboxylic acid containing 2 to 7 carbon atoms and having a dissociation index $pK_a$ larger than 4.0, or an anhydride thereof; and
   (c) from 2 to 10 moles per mole of the alkoxysilane of an alcohol containing 1 to 4 carbon atoms;
and reacting the components (a), (b) and (c) above to such an extent that the amount of the lower carboxylic acid in the resulting reaction mixture is less than 20% of the amount initially present in the reaction mixture.

14. A method for forming a silica-based coating film on a substrate which comprises coating the substrate with a liquid coating composition of claim 1, drying the liquid coating composition and heating the thus dried coating composition at a temperature of at least 150° C.

* * * * *

UNITED STATES PATENT AND TRADEMARK OFFICE
CERTIFICATE OF CORRECTION

PATENT NO. : 4,277,525
DATED : July 7, 1981

INVENTOR(S) : MUNEO NAKAYAMA ET AL

It is certified that error appears in the above—identified patent and that said Letters Patent is hereby corrected as shown below:

On the title page

Address of Assignees - Item [73] should read:

---both of Kawasaki, Japan---.

*Signed and Sealed this*

*Twenty-sixth* Day of *October 1982*

[SEAL]

Attest:

Attesting Officer

GERALD J. MOSSINGHOFF

Commissioner of Patents and Trademarks